W. A. SCOTT & G. W. WILLIAMS.
Smoke-Stack.

No. 219,986. Patented Sept. 23, 1879.

WITNESSES:
C. Neveux
C. Sedgwick

INVENTOR:
W. A. Scott
G. W. Williams
BY Munn & Co
ATTORNEYS.

UNITED STATES PATENT OFFICE.

WALTER A. SCOTT AND GEORGE W. WILLIAMS, OF WINONA, MINNESOTA.

IMPROVEMENT IN SMOKE-STACKS.

Specification forming part of Letters Patent No. 219,986, dated September 23, 1879; application filed August 9, 1879.

*To all whom it may concern:*

Be it known that we, W. A. SCOTT and G. W. WILLIAMS, of Winona, in the county of Winona and State of Minnesota, have invented a new and useful Improvement in Smoke-Stacks, of which the following is a specification.

Our invention relates specifically to improvements in the manner of connecting the two parts of the stack, between which the edge of the wire-netting spark-arrester is held.

Heretofore the two parts have been connected by flanging the adjacent edges outwardly and passing bolts or rivets through the flanges, the netting being held between them. This, however, is objectionable on account of the time and labor required to separate and rejoin the parts when it is desired to change the netting, as has frequently to be done.

Now, the object of our invention is to enable the joint between the two parts to be separated and remade quickly and easily; and it consists in fastening the two flanges together by means of a grooved or channeled tubular ring cut on one side placed over and around the two flanges, so as to hold them together, and fastening the ring by a bolt passed through two outward projections on its ends.

Figure 1:
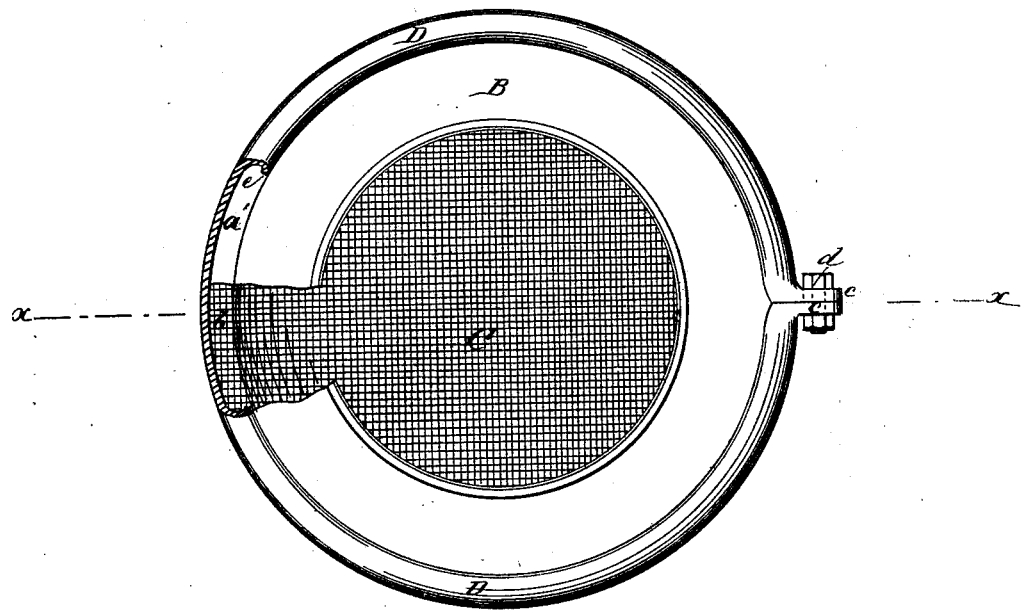
Figure 2:
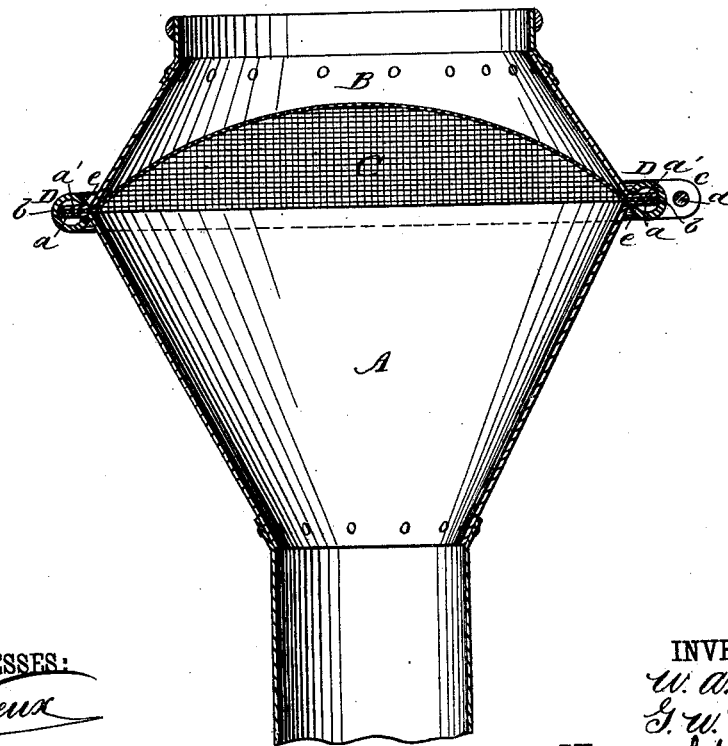

In the accompanying drawings, Figure 1 is a top plan or view of our improvement, partly in section, applied to a locomotive-stack; and Fig. 2 is a vertical section of the same on line $x\ x$ of Fig. 1.

Similar letters of reference indicate corresponding parts.

Referring to the drawings, the lower inverted cone, A, of the head of the stack has its base flared outward, forming a horizontal flange, $a$, and the base of the upper cone, B, is flared in the same manner, forming a flange, $a'$. These two flanges are placed together with the edge $b$ of the wire-netting C clasped between, as clearly shown in Fig. 2. Heretofore these two flanges and the netting have been fastened together by bolts and nuts, or by rivets; but these modes are objectionable, as before stated, and the object of our invention is to provide a better fastening, which we will now describe. It consists of a ring, D, made of a hollow tube bent into a circle, and with the ends bent out to form two projections, $c\ c$, parallel to each other, and adapted to be joined together by a laterally-placed bolt, $d$, secured by a nut.

A circumferential channel, $e$, is cut through the inside of the tubular ring of sufficient width to receive the flanged joint between the two parts of the stack.

The operation of our improvement can be readily understood from the accompanying drawings.

The netting being placed over the lower section, with its edge resting on the flange $a$, the upper section is placed over it, with its flange $a'$ on the edge of the netting, forming a flanged joint, as clearly shown. The ring D is now taken, and being placed over the stack is sprung slightly, so as to admit the flange-joint into and through the groove $e$. The ends of the tubular ring are then fastened together by bolt $d$ passed through the projections $c\ c$. In this way, as may be readily seen, the two parts may be separated and rejoined quickly and easily, there being but one bolt to be removed, whereas heretofore the taking of the net out involved considerable labor and the expenditure of a great deal of time on account of the number of bolts or rivets employed in fastening the two parts of the stack together, which had to be taken out.

Having thus described our invention, we claim as new and desire to secure by Letters Patent—

As an improvement in smoke-stacks, the tubular ring D, with inner circumferential groove $e$, and projections $c\ c$ on the ends, adapted to be connected together by a bolt, $d$, in combination with the flanges $a\ a'$ of the two sections of the stack and the edge $b$ of the net C, placed between them for the purpose of fastening the flanges and netting together, substantially as described.

WALTER A. SCOTT.
GEORGE WASHINGTON WILLIAMS.

Witnesses:
H. D. THORNBERRY,
CHAS. H. REYNOLDS.